Figure 1:
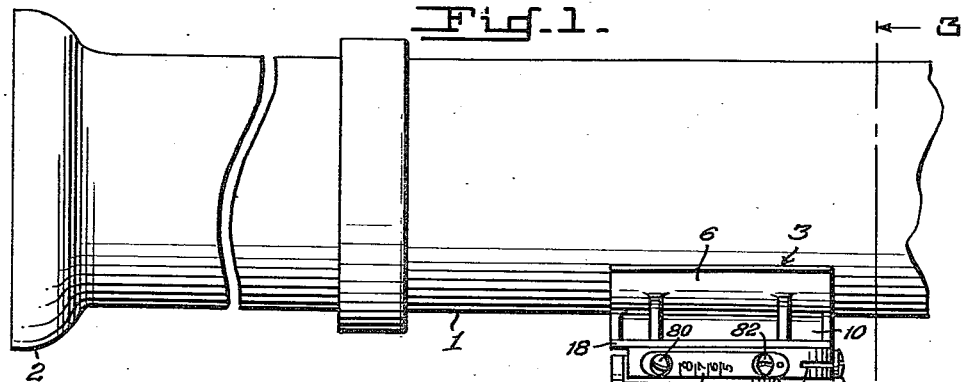

Nov. 26, 1957 P. I. EVANS ET AL 2,814,118
SIGHT MOUNT FOR A ROCKET LAUNCHER
Filed Feb. 14, 1955 3 Sheets-Sheet 1

INVENTORS,
Paul I. Evans
Herbert Harvey
BY W. E. Thibodeau, A. W. Dew
and S. J. Rotondi, Jr.
ATTORNEYS Nov. 26, 1957 P. I. EVANS ET AL 2,814,118
SIGHT MOUNT FOR A ROCKET LAUNCHER
Filed Feb. 14, 1955 3 Sheets-Sheet 2
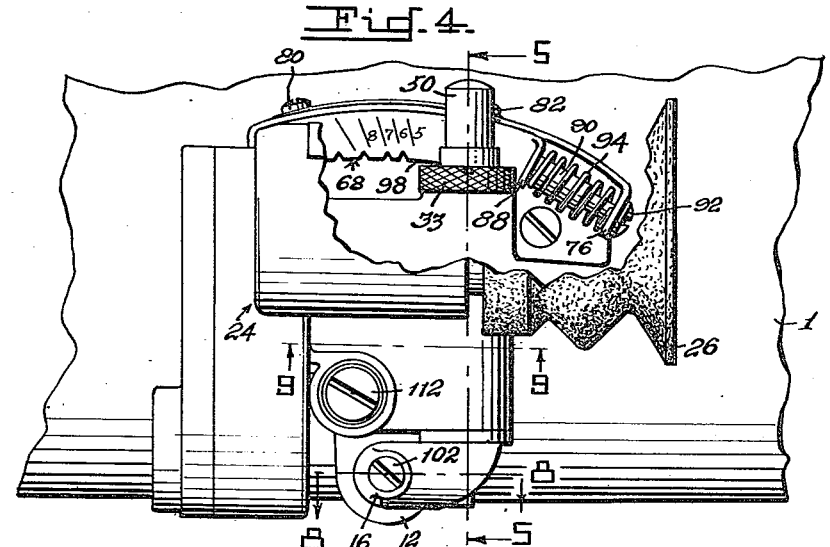
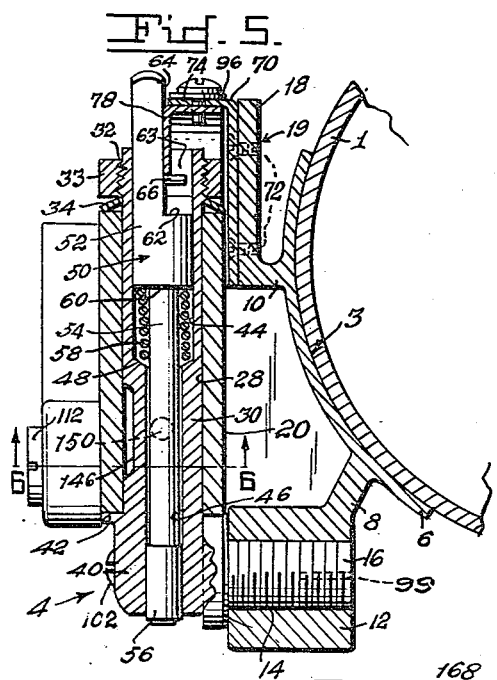
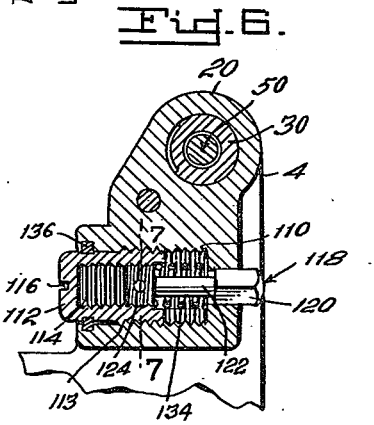
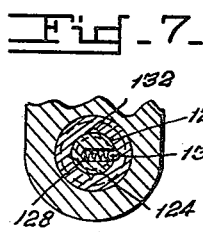
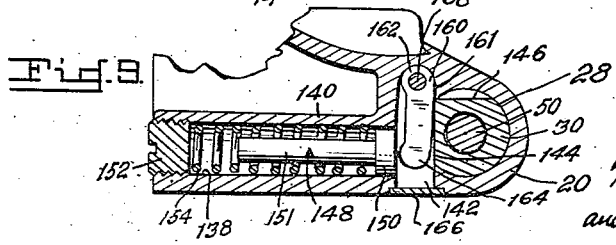
INVENTORS,
Paul I. Evans
Herbert Harvey
BY Nov. 26, 1957   P. I. EVANS ET AL   2,814,118
SIGHT MOUNT FOR A ROCKET LAUNCHER
Filed Feb. 14, 1955   3 Sheets-Sheet 3

INVENTORS,
Paul I. Evans
BY Herbert Harvey
W. E. Thibodeau, A. W. Dew
and S. J. Rotondi, Jr.
ATTORNEYS United States Patent Office 2,814,118
Patented Nov. 26, 1957

2,814,118

SIGHT MOUNT FOR A ROCKET LAUNCHER

Paul I. Evans, Long Beach, and Herbert Harvey, Redondo Beach, Calif., assignors to the United States of America as represented by the Secretary of the Army Application February 14, 1955, Serial No. 488,174

14 Claims. (Cl. 33—48)

This invention relates to a sight mount, and more particularly to a sight mount for use with the "Bazooka" rocket launcher.

The present invention is designed to replace the simple reflector sight which has been used on the Bazooka type rocket launcher and to provide a sight of improved accuracy and ease of adjustment, capable of being mounted on the existing launcher sight bracket with little or no rework.

The invention provides a sight incorporating numerous useful features within a small space and is very light in weight. The general arrangement and application also provide unique and novel bore sighting, folding, azimuth and elevation control or positioning.

Accordingly a primary feature of this invention is the provision of a small, lightweight cast aluminum envelope or sight body to house the optical unit and control mechanisms.

A secondary aim is to provide a sight mount having spring-loaded, screw-controlled boresight adjustments operable by a single operator while looking through the sight, and capable of fine adjustment to provide positive lock.

Yet another object of the invention is to provide a sight mount that may be easily folded against the launcher tube to protect the eyepiece of the sight, and thereby insuring less width for the launcher for storing, carrying, and when not in use.

Still another object of the invention is the incorporation of an adjustable stop within the sight body for adjusting the sight to zero azimuth.

Yet a further object of the invention is the provision of a range-setting mechanism and including a range positioning release plunger that is positive in all positions to 900 yards, and incorporating a range setting lock or detent, very simply operated by the gunner with the same hand while he is moving the sight in elevation.

A still further object of the invention is the provision of a sight mount that is capable of adjustment in azimuth and elevation while the gunner is looking through the eyepiece.

Figure 2:
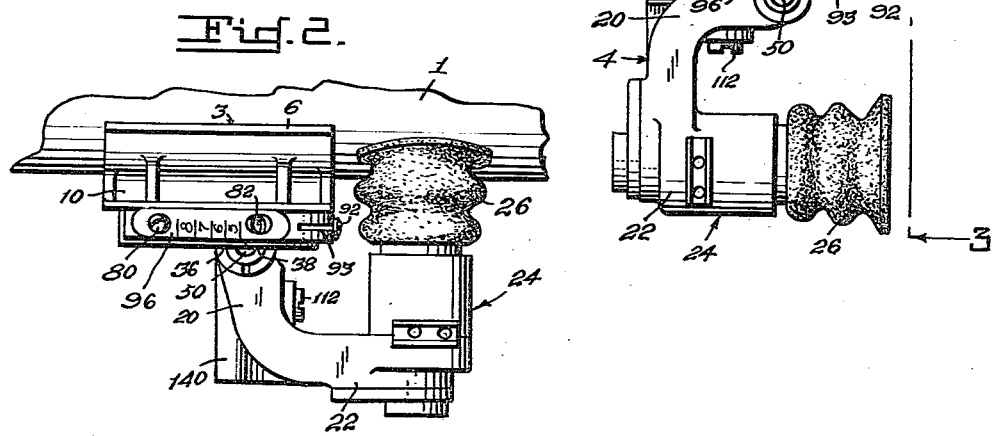
Figure 3:
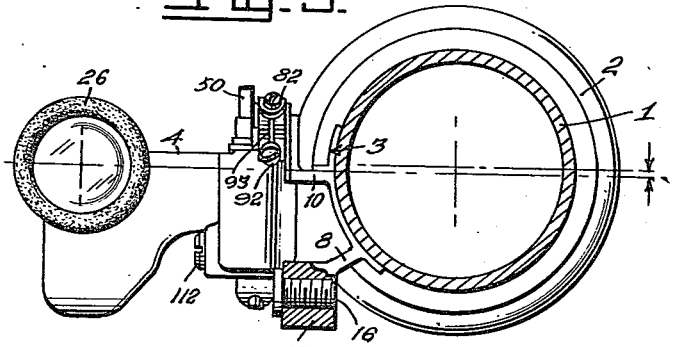
Figure 8:
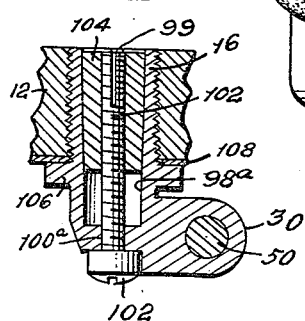
Figure 10:
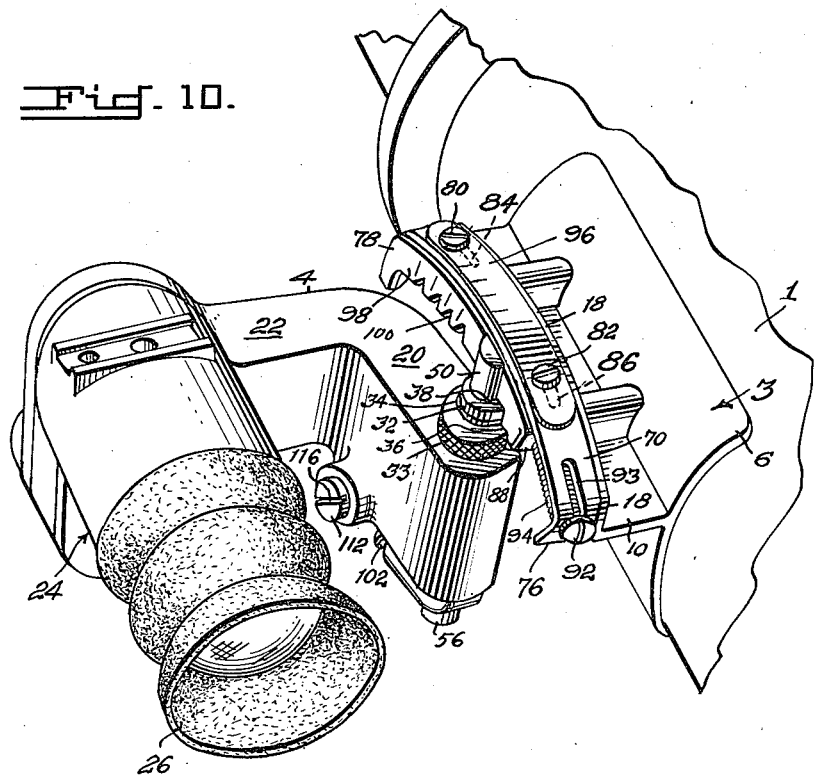
Figure 11:
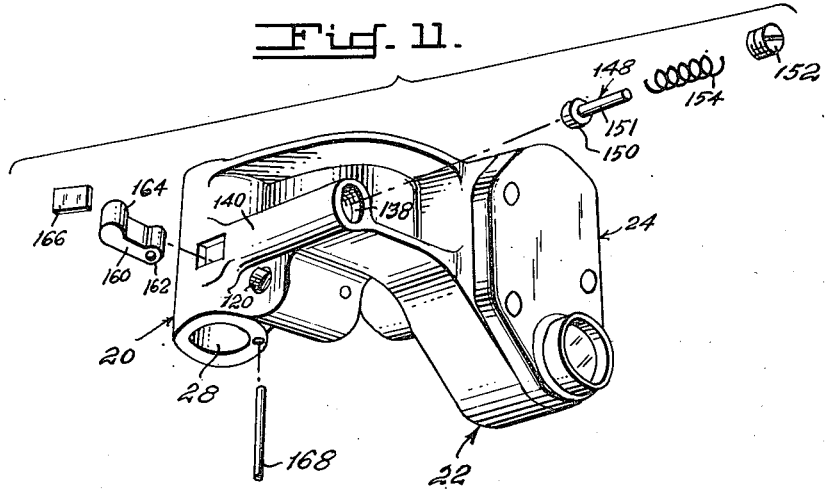

The specific nature of the invention as well as other objects and advantages thereof, will clearly appear from a description of a preferred embodiment as shown in the accompanying drawings in which:

Figure 1 is a top plan view illustrating a sight mount constructed in accordance with the invention, and mounted to a rocket launcher sight bracket, the sight being in extended position, Figure 2 is a similar view illustrating the sight in folded position, Figure 3 is a cross sectional view taken along line 3—3 of Figure 1 and looking from the rear of the sight, Figure 4 is a side elevation of the sight mount on an enlarged scale, parts of the sight being broken away to reveal the elevation plate, and other boresight adjusting mechanism, Figure 5 is a cross sectional view taken along line 5—5 of Figure 4 looking in the direction of the arrows, and showing details of range positioning release plunger and mechanism, Figure 6 is a sectional detail of the azimuth, boresight adjusting mechanism or stop, taken along line 6—6 of Figure 5 and looking in the direction of the arrows, Figure 7 is a sectional detail of the ball detent taken along line 7—7 of Figure 6, Figure 8 is a sectional detail of the pivot and mounting post, taken along line 8—8 of Figure 4 and looking in the direction of the arrows, Figure 9 is a sectional detail of the sight positioning or folding detent mechanism, taken along line 9—9 of Figure 4, Figure 10 is a perspective view of the sight mount of the invention, as viewed from the rear at an oblique angle, and Figure 11 is a perspective view of the sight body as viewed from the front, parts of the sight positioning mechanism being in exploded arrangement.

Referring more particularly to the drawing wherein like reference characters have been used to indicate like or corresponding parts throughout the different views, reference character 1 designates a rocket launcher tube generally, provided with the usual muzzle flash protector 2, and having rigidly mounted thereon a sight bracket 3 for receiving the sight body or mount 4 in which are mounted the later to be described optical unit and azimuth and elevation boresight adjusting mechanisms.

As most clearly seen in Figures 1 and 5 the sight bracket 3 comprises an arcuate plate segment 6 secured to the left peripheral surface of launcher tube as seen from the rear, and having a downwardly and outwardly depending lower integral arm 8 and upper horizontally extending integral arm 10 coextensive with the length of the plate 6. Formed integral with lower arm 8 is a laterally extending cylindrical boss or bearing 12 provided with a transverse bore 14 to receive a lateral pivot post 16 integral with a later to be described vertical tubular shaft about which the sight mount 4 pivots when it is to be folded. Arm 10 in turn is provided with a vertical flange 18 to form therewith an L-shaped support member 19 to mount parts of the later to be described elevation boresight adjusting mechanism.

The sight mount 4 is a cast aluminum body essentially right angled in contour, as clearly seen in Figures 10 and 11, and in sight operating position one leg 20 of the body is disposed parallel with a vertical plane through the longitudinal axis of the launcher, and the other leg 22 extends normal thereto, there being a collimating eye piece 24 secured to the outer free end of leg 22, with its longitudinal axis normally parallel to the corresponding axis of the launcher. The eyepiece 24 is provided with a rubber eye shield 26 to protect the gunner against eye injury.

Referring again to Figure 5, leg 20 of sight mount 4 is provided with a vertical bore 28 adjacent its rear end for receiving a tubular shaft 30 sight mount for rotation therein, and having an upper threaded end 32 extending above the top surface of the sight body to receive a knurled retaining nut 33, there being a convex spring washer 34 disposed between the opposed surfaces of the nut and tubular shaft 30 to insure resilient securement of the shaft within bore 28 and to provide a bearing surface as the sight mount is moved from extended to folded position. Nut 33 and tubular shaft 30 are also provided with diametrically aligned slots 36, 38 in their upper surfaces, for a purpose to be later described, the said slots being disposed approximately parallel to the longitudinal axis of the collimating eye piece 24, shaft 30 also being enlarged adjacent its lower end, as at 40, to provide a shoulder or horizontal flange 42 for engaging the lower surface of the sight body about bore 28 to insure against vertical upward displacement of the shaft.

Shaft 30 is provided with a vertical bore, the upper half 44 of said bore being of enlarged diameter and communicating with the reduced bore 46 occupying the lower half of the shaft, said bores forming therebetween a shoulder 48. Received in the bores 44, 46 is a range positioning release plunger or pin 50 having an enlarged portion 52 slidably engaging the upper portion of bore 44, and extending a short distance above and beyond the upper end of shaft 30, and a portion 54 of diameter slightly smaller than bore 46 occupying the remaining lower half of bore 44 and extending downwardly into reduced bore 46, pin 50 being again enlarged at its lowermost end 46 to slidably engage the wall of bore 46. A helical spring 58 surrounding the upper half pin 50 of slightly reduced diameter, extends between shoulder 48 and a shoulder 60 formed by the enlarged and reduced portions 52 and 54 of pin 50 to bias the pin permanently in an upward direction. The upper enlarged half 52 of pin 50 is diametrically cut as at 62 for a portion of its length to form a space 63 with the inner wall of tubular shaft 30 and extending outwardly from the flat face 64 formed by said cut is a pin 66 integral with pin 50, adapted to engage the elevation plate assembly 68, now to be described.

The elevation or range plate assembly 68 as best illustrated in Figures 4, 5, and 10, comprises an inverted L-shaped bracket or first range plate 70 coextensive in length with vertical flange 18 and mounted by screws 72 to the outer flat face of flange 18, the short leg, or flange 74 of bracket 70 being arcuately shaped and having its rear edge turned downwardly to form a tab 76. An arcuate L-shaped elevation or second range plate 78 of shorter length than bracket 70 is disposed so that the upper face of its shorter leg abuts the lower face of leg 74 on bracket 70, and is adjustably secured thereto by screws 80, 82 slidable in longitudinal slots 84, 86 respectively, formed in the leg 74 of bracket 70. The rear edge of elevation plate 78 is turned downwardly to form a tab 88 parallel to and spaced forwardly of tab 76. A boss or nut 90 is secured to the rear face of tab 88 to receive the threaded end of a positioning screw 92 inserted into longitudinally slotted aperture 93 formed in the upper face of bracket 70 and extending into tab 76. An anti-back-lash spring 94 is positioned about screw 92 and extends between the tabs 76 and 88. Suitable indicia may be marked on the outer vertical face of elevation plate 78, and in addition a longitudinally adjustable arcuate auxiliary range plate 96 may be secured to the upper face of bracket 70 to provide visual indication for adjustment from the top as well as from the side of the assembly. The above described assembly provides vertical adjustment of the line of sight if the boresighting procedure determines that such adjustment is necessary. In effecting such adjustment screws 80, 82 are first loosened, then positioning screw 92 is manipulated to shift the elevation plate which is movable with respect to the fixed elevation bracket 70, so that zero range is indicated on the indicia after the sight has been either depressed or elevated as determined by boresighting procedure. The screws 80, 82 are then tightened to lock the range positioning device in proper position in elevation.

As clearly seen in Figure 10, the lower edge 68 of elevation plate 78 is serrated for a portion of its length forwardly as at 100, the depression in each serration corresponding to a designated range as marked on the elevation plate indicia. The edge 98 is adapted to be received in slots 36, 38 in nut 33 and shaft 30, respectively, and pin 66 is urged against the unserrated portion of edge 98 or into one of the serrations by virtue of the bias of spring 58 about pin 50. As previously described the entire sight body is adapted to pivot horizontally about pivot post 16, and release of the sight body for such pivoting may be effected by pressing down on the range positioning release plunger or pin 50.

Pivot post 16 is threadably mounted in transverse bore 14 in cylindrical boss 12 and is therefore conducive to looseness or backlash with resulting errors in azimuth and elevation, hence means are provided to eliminate a goodly portion of such error. This means is illustrated best in Figure 8, viewed in conjunction with Figure 5. The pivot post 16 is an externally threaded cylindrical member integral with tubular shaft 30 and provided with an axial counterbore 98a communicating with an axial bore 100a to receive a kerfed draw-screw 102 which extends into the counterbore 98a and which in turn has its free threaded end received in an internally threaded tapered expansion plug or sleeve 104 adapted to engage the side wall of counterbore 98a. The pivot post 16 is slotted at its outermost end as at 99 and is in turn provided with an annular external enlargement or flange 106 which is adapted to engage the outer face of cylindrical boss 12 on the sight bracket. A spring washer 108 is positioned between the opposed faces of flange 106 and boss 12. In order to prevent back lash and to insure a tight fit between pivot post 16 and boss 12, the draw screw 102 is tightened thereby causing expansion plug 104 to travel up the screw until a slight binding is felt. In view of the diametrical slots 99, this operation seats the threads of pivot post 16 within the internal threads of transverse bore 14 and prevents any backlash.

The azimuth adjusting mechanism can be seen by referring to Figure 10, and is illustrated in detail in Figures 6 and 7. The mechanism is located in a threaded transverse bore 110 in the lower central portion of the longitudinal arm of sight body 4. A hollowed out cap screw 112 having external threads 113 to mate with the threads in bore 110, and having internal threads 114 is inserted in bore 110 with its kerfed head 116 facing outwardly to receive the working edge of a screw-driver. An adjusting screw 118 having a squared head 120, slidably fitting a squared hole in sight body 4 a reduced medial portion 122, and enlarged threaded shank end 124 is inserted into the reduced inner end of bore 110 so that threaded end 124 mates with internal threads 114 in cap screw 112, a portion of head 120 extending beyond the adjacent surface of sight mount 4, to engage the flat face of the elevation bracket such that when adjusting screw 118 is turned, lateral adjustment of the sight is effected. Threaded shank end 124 is provided with a transverse bore 126 (see Figure 7) for receiving a coil spring 128 which serves to bias a detent ball 130 radially outwardly into a plurality of spherical cavities or pockets 132 formed in the inner face of hollowed out cap screw 112. As adjusting screw 118 is turned the detent ball 130 will click into one of pockets 132 to yieldingly hold the screw 118 in place. A helical spring 134 surrounds medial portion 122 and extends between the threaded head of screw 118 and the shoulder at the inner end of bore 110 to insure against back lash. A snap ring 136 received in transversely alined slots in the outer periphery of cap screw 112 and in sight body 4 prevents accidental displacement of the component parts of the azimuth boresight. The threads between cap screw 112 and sight body 4 are of relatively coarse pitch and of one hand, while those between screw 112 and the threaded end 124 of screw 118 of finer pitch and of the same hand. Consequently, for example, for a full turn of screw 112, the same is moved axially a distance in one direction equal to the pitch of the coarser threads while at the same time screw 118 is moved in the opposite direction a distance equal to the pitch of the finer threads. In the operation of this mechanism, turning the adjusting screw 112 will cause detent ball 130 to click into a pocket 132 for each quarter turn thereof. The adjustment thus provides a differential screw arrangement in which the small ball detent and corresponding pockets are calibrated to indicate 1 mil movement per click (¼ turn) to provide fine adjustment in azimuth of the sight piece.

As previously indicated the sight piece is constructed so that it folds against the launcher to protect the eye piece and to reduce overall width of the launcher. Figure 1 illustrates the sight piece in unfolded "ready to use" position. Figure 2 shows the sight piece in folded position, and Figures 5 and 9 illustrate the construction details including the spring loaded detent mechanism for positively locking the sight body in either folded or unfolded position.

The one piece sight mount 4 is rotatable about shaft 30 which remains in fixed position as does elevation plate 78 and range positioning plunger 50. The spring loaded detent mechanism for locking the sight in folded and unfolded position is mounted in a horizontal bore 138 (see Figure 11) formed in a cylindical boss 140, disposed at right angles to and in open communication with the vertical bore 28 by way of a lateral key way 142. Tubular shaft 30 which is received in bore 28 and which is contiguous the inner face of keyway 142 is provided with a V-shaped portion defining a pair of flat sides 144, 146 disposed at right angles to one another for a purpose which will presently appear. See Fig. 9. An elongated plunger 148 is reciprocable in bore 138 and comprises a cylindrical enlargement 150 of short length engaging the innermost end of the bore adjacent keyway 142 and an elongated reduced end 151 extending outwardly toward a screw plug 152 which closes off the outer end of bore 138. A coil spring 154 encircles reduced portion 151 and extends between the opposed faces of screw plug 152 and enlargement 150, to bias plunger 148 inwardly toward shaft 30.

A generally rectangular key 160 with a flat face 161 adjacent shaft 30 and bulbous ends 162, 164 is pivotally disposed in keyway 142, there being a pivot pin 168 extending through end 162 while bulbous end 164 abuts the inner face of enlargement 150. A closure plate 166 seals off the outermost end of key way 142 to keep out dirt, dust and other objectionable substances. The plate may be made removable to permit oiling and greasing of parts in the well known manner. Flat sides 144, 146 of shaft 30 cooperate with flat face 161 of key 160 to positively lock the mount in folded or unfolded position, such locking engagement being effected by the tight abutting contact of face 161, biased into such position by spring 154, with either flat side 144 or 146 of shaft 30 depending on whether the sight is in folded or unfolded poistion. The above described mechanism is instrumental to hold the sight piece in either extended or folded position as desired. However, and in view of the pivotal action of key 162 on spring biased plunger 148, it is apparent that only sufficient force need be applied to overcome the detent or locking action in order to move the sight piece from any one present position to the other. As the eye piece is not provided with a cover, its position against the launcher when folded serves as a protection for the said eye piece, and in addition provides for a more compact arrangement of gun and sight piece for shipping and storing.

With the above description it is apparent that a sight mount has been disclosed which has many advantages over existing sight mounts, is simpler to operate, more compact, more accurate because of the fine adjustments provided, and tight and rattle free because the joints are spring loaded.

While a preferred form of the invention has been illustrated and described, various modifications will occur to persons skilled in the art, after a study of the foregoing disclosure. It is therefore intended that the disclosure be illustrative and not limiting, and that such modifications may be made without departing from the spirit and scope of the invention as defined in the subjoined claims.

We claim:

1. In combination with a sight mount for a rocket launcher comprising, a sight mount bracket integrally mounted upon said rocket launcher, a substantially angular shaped one-piece sight mount body forming first and second legs and having a collimating eyepiece affixed to said first leg, means for pivotally mounting said body to said sight mount bracket received within a vertical bore in the second leg of said body, elevation boresight adjusting means carried by said sight bracket, means for adjusting said body in azimuth housed within a first transverse horizontal bore in said second leg of said body and means for positioning and holding said body in extended or folded position received in a second longitudinal bore within said second leg of said body.

2. In a mechanism for pivotally mounting an angularly-shaped sight mount bracket upon a rocket launcher sight bracket and comprising a sight body, a tubular shaft pivotally mounted within a vertical bore formed in one leg of said body, a transverse horizontally extending externally threaded pivot post received in a bore in said bracket and integral with said shaft and having its outer end slotted, said pivot post having an axial bore, a tapered plug having an internally threaded longitudinal bore received within said axial bore, a draw screw having a slot in its threaded end and threadably engaging the threads in said longitudinal bore, said screw adapted to draw said plug within said pivot post and expand the same to provide tight frictional engagement between the pivot post and said bracket, a range plate assembly carried by said bracket coaxially about said pivot post, an upwardly biased, spring loaded release pin adjustably mounted within the axial bore in said tubular shaft, said release pin having its upper portion provided with a diagonal cut-out portion and an index pin fitted into and extending horizontally from said cut-out portion to engage with a series of notches in said range plate assembly to hold said sight body in a selected one of a plurality of range settings.

3. The device of claim 1 wherein said boresight adjusting means comprises first and second range plates of substantially angle-shaped cross section, said first plate rigidly secured to said sight bracket, said second plate slidably adjustable therewith, said second plate having its rear end disposed forwardly of the rear end of said first plate, each of said plates provided with downwardly struck tabs at their rearward ends thereof, and a spring-loaded adjusting screw threadably engaged within the tab of said first plate and received within a nut upon the tab of said second plate for adjustment therewith, said first and said second plates having suitable indicia inscribed upon their upper and side faces respectively to register with a release pin housed within said body to indicate range settings.

4. The device of claim 1, wherein said azimuth adjusting means comprises a hollow externally and internally threaded cap screw received within said first horizontal bore, a spring-loaded screw having an externally threaded head portion at one end thereof to mate with the internal threads in said cap screw and a square nut portion at its other end, said square nut portion extending through a reduced square bore in said sight mount body to provide an adjustable stop abutting said sight bracket upon said launcher when said body is in fully extended position, a spring loaded detent ball mounted in a transverse bore provided in said threaded head portion of said screw and adapted to click into one of a series of longitudinal pockets formed in the inside periphery of said cap screw to hold said stop in selected positions, and a snap ring seated within the outer end of said threaded bore in said sight mount body to limit adjustment of said cap screw.

5. The device of claim 1, wherein said means for positioning said sight mount body in folded or extended position comprises, a spring loaded plunger mounted for reciprocation within said second longitudinal bore and communicating with said vertical bore, a flat key member mounted with an a keyway cut in said sight mount body and pivoted at one end thereof, the other end having a rounded portion bearing against said plunger and a straight edge bearing against one face of a substantially V-shaped portion defining a pair of flat faces disposed at right angles to one another provided on said tubular shaft, normally holding said body against accidental movement when in extended or folded position.

6. In a sight for a rocket launcher having a launcher tube symmetrical about a longitudinal axis, a bracket adapted to be mounted upon said launcher, a sight body, a collimator including an eye piece mounted on said sight body, a horizontal post pivotally mounted on said bracket and defining a pivot axis normal to said longitudinal axis, a vertical shaft received in a correspondingly vertical bore in said sight body and integral with said pivot post, said shaft defining a pivot axis for said sight body perpendicular to the normal line of sight of collimator, said sight body being pivotable about said shaft from first position with said collimator having a line of sight generally parallel to said longitudinal axis, to second position with said eye piece in abutting relation with the surface of said launcher tube, and means in said sight body cooperating with said shaft to releasably hold said sight body in first or second position.

7. The device of claim 6, and including means in said sight body cooperating with said bracket to adjust the line of sight of said collimator to zero azimuth, and means in said sight body cooperating with said bracket to adjust the line of sight of said collimator to zero elevation.

8. The device of claim 6, and including a range plate mounted on said bracket and having indicia for giving a visual indication of a range setting for said sight body corresponding to pivotal movement of said sight body about said pivot post, and detent means on said sight body for engaging said range plate and locking said sight body in predetermined range setting.

9. In a sight mount for a gun, a bracket having a normally horizontal pivot bearing defining an elevation axis, a pivot post journaled in said bearing, a tubular shaft fixed with said pivot post and having a bore with axis normal to said elevation axis, a sight mount body journaled on said tubular shaft, a range plate assembly fixed on said bracket coaxially of said elevation axis, and manually operable means movably mounted within said tubular shaft and cooperating with said range plate assembly to hold said body in a selected one of a plurality of elevation adjustments about the axis of said pivot post.

10. In a sight mount for a gun, a sight bracket, a tubular shaft, means journaling said shaft on said bracket for adjustment about an elevation axis normal to said shaft, a sight mount body having a bore receiving said tubular shaft to mount said body for azimuthal adjustment, a range plate assembly fixed on said bracket coaxially of said elevation axis, manually-actuable detent means mounted within said tubular shaft, spring-urged toward said range plate assembly, and cooperating means between said detent means and said range plate assembly to releasably hold said body in a selected one of a plurality of range adjustments about said elevation axis.

11. In an elevation and azimuth adjustable sight mount for a gun, a bracket, a tubular shaft, means journaling said tubular shaft on said bracket for elevation adjustment about a first axis normal to said shaft, a sight mount body having a bore receiving said tubular shaft with a smooth fit, and providing for azimuth adjustment of said body about a second axis, a range plate assembly carried by said bracket and including a range plate having a notched edge coaxially about said first axis, a plunger slidably mounted in the bore of said tubular shaft, a pin projecting radially from one end of said plunger and engageable in any selected notch of said range plate, and spring means urging said plunger toward said range plate, said plunger, pin and spring coacting to releasably retain said body in a selected position of elevation adjustment relatively to said range plate assembly.

12. A sight mount as recited in claim 11, an adjusting screw axially movable in an opening in said body in a path offset from and parallel with said first axis, manually operable means for so moving said screw and means carried by said body and operating to yieldably urge an end of said screw against said bracket.

13. In a sight mount for a rocket launcher, a bracket for securement to the launcher tube, a tubular shaft, means mounting said shaft to said bracket for pivotal adjustment about an elevation axis normal to the axis of said shaft, a sight mount body journaled on said shaft for adjustment in azimuth about the axis thereof, a first arcuate elevation plate secured to said bracket coaxially of said elevation axis, a second arcuate elevation plate coaxially of said elevation axis, means connecting said plates for relative sliding adjustment about said elevation axis, means acting between said plates to manually effect positive bore-sight adjustment of said second plate relatively to said first plate, and means mounted within said tubular shaft and releasably engaging said second plate to selectively vary the elevation adjustment of said body about said elevation axis.

14. A sight mount as recited in claim 13, said body being generally L-shaped in plan and having a bore at one end of a first leg and receiving said tubular shaft with a smooth fit, a sight device carried at the extremity of the second leg of said body with its line of sight generally perpendicular to said second leg, means carried by said body and shaft to yieldingly retain said body in a selected one of two positions, first, with the line of sight of said sight device outstanding from and in a plane parallel with the bore axis of the launcher tube and second, with said sight folded against the launcher tube with its line of sight normal to the axis of the tube, and manually operable means carried by said body and engageable with said bracket when said body is in said first position to vary the angular position of said body about said tubular shaft.

No references cited.